P. OSTENBERG.
IMPULSE STARTER.
APPLICATION FILED APR. 3, 1919.

1,307,791.

Patented June 24, 1919.
2 SHEETS—SHEET 1.

INVENTOR
Pontus Ostenberg
BY John A. Naismith
HIS ATTORNEY

P. OSTENBERG.
IMPULSE STARTER.
APPLICATION FILED APR. 3, 1919.
1,307,791. Patented June 24, 1919.
2 SHEETS—SHEET 2.
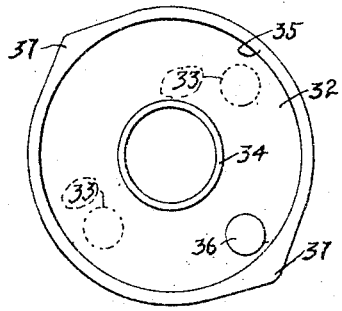
FIGURE 10
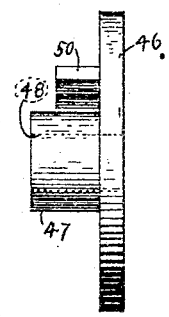
FIGURE 15
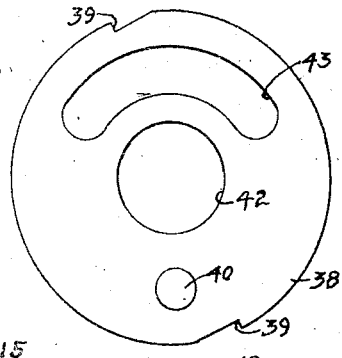
FIGURE 12
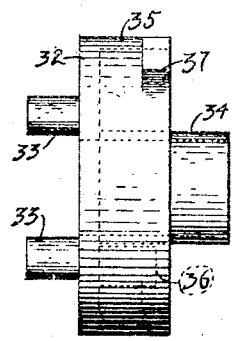
FIGURE 11
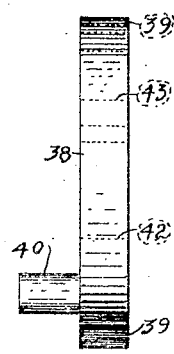
FIGURE 13
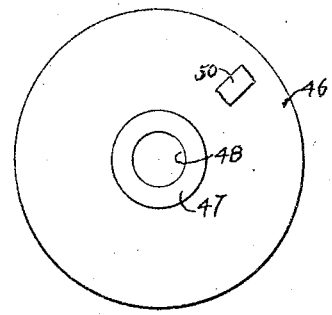
FIGURE 14
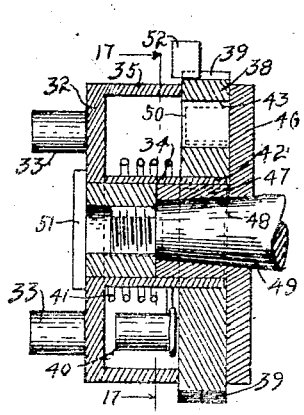
FIGURE 16
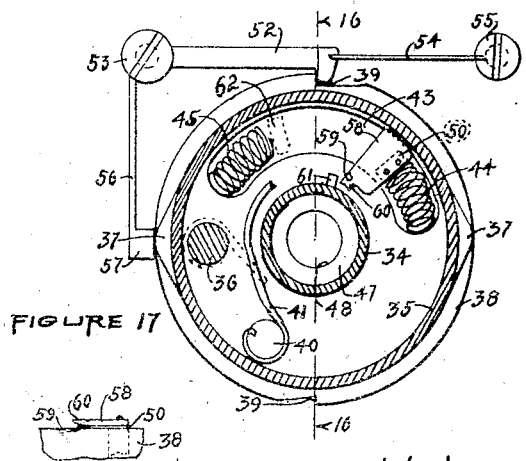
FIGURE 17
FIGURE 18
INVENTOR
Pontus Ostenberg
BY John A. Naismith
HIS ATTORNEY

UNITED STATES PATENT OFFICE.

PONTUS OSTENBERG, OF SANTA CLARA COUNTY, CALIFORNIA.

IMPULSE-STARTER.

1,307,791.     Specification of Letters Patent.     Patented June 24, 1919.

Application filed April 3, 1919. Serial No. 287,147.

*To all whom it may concern:*

Be it known that I, PONTUS OSTENBERG, a citizen of the United States, and residing in the county of Santa Clara and State of California, have invented certain new and useful Improvements in Impulse-Starters, of which the following is a specification.

My invention relates to devices for causing an electric generator to emit a hot spark upon starting. The object of my invention is to combine with an impulse starter of any suitable type a means for retarding the initial spark so that it occurs after the engine piston has passed a dead center and thereby prevent back firing and means for advancing the magneto armature with relation to the impulse starter so that normal sparking of the generator may be effected, and at the same time to provide shock absorbing means whereby the life of the generator is materially increased and its efficiency and utility greatly enhanced. Broadly speaking, my invention consists in a method of operating an electric generator whereby the results above indicated are secured with but little mechanical complication added to known devices.

In the drawings:—

Fig. 10 is an inside elevation of the driving member of another embodiment of my invention.

Fig. 11 is an edge elevation of the member in Fig. 10.

Fig. 12 is an inside elevation of the driven member of the embodiment referred to in the reference to Fig. 10.

Fig. 13 is an edge elevation of the member in Fig. 12.

Fig. 14 is an inside elevation of the member inserted between the driven member and the magneto armature of this device.

Fig. 15 is an edge elevation of the member in Fig. 14.

Fig. 16 is a sectional view on line 16—16 of Fig. 17.

Fig. 17 is a sectional view on line 17—17 of Fig. 16.

Fig. 18 is a detail illustration of the means for locking the driven member to the armature of the magneto.

Figure 1:
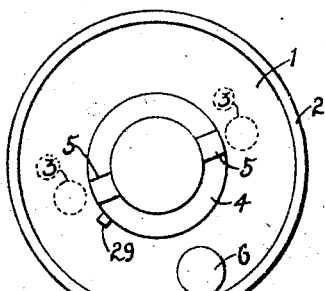
Figure 1 is an inside elevation of the driving member of the device.
Figure 2:
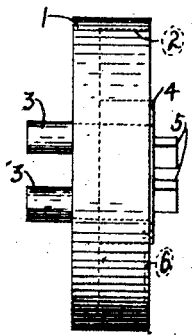
Fig. 2 is an edge elevation of the part shown in Fig. 1.
Figure 3:
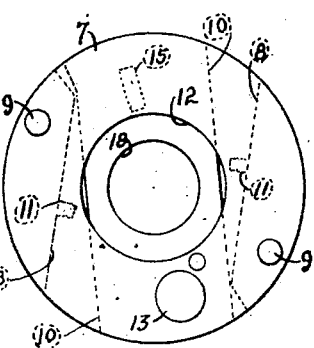
Fig. 3 is a side elevation of the driven member.
Figure 4:
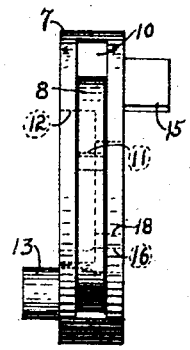
Fig. 4 is an edge elevation of the member in Fig. 3.
Figure 5:
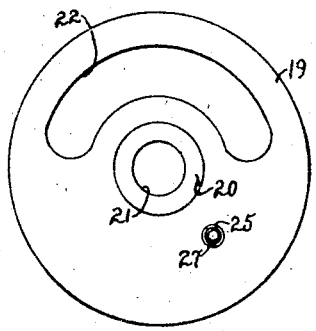
Fig. 5 is an inside elevation of the member inserted between the starter and the magneto armature.
Figure 6:
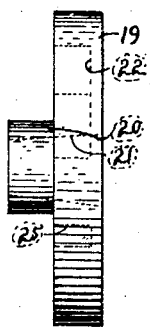
Fig. 6 is an edge elevation of the member in Fig. 5.
Figure 8:
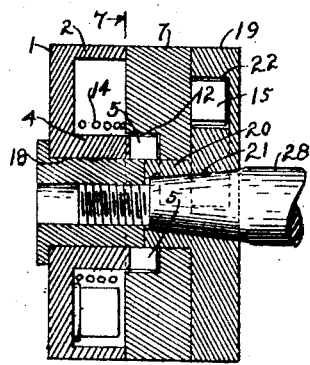
Fig. 8 is a sectional view on line 8—8 of Fig. 7.

At 1 is the driving member provided with flange 2 and means 3 on its outer surface for attaching a driving mechanism not shown. A hub 4 is provided of substantially the same depth as flange 2 and is provided with two diametrically opposite lugs 5 projecting a distance forwardly therefrom. A pin 6 is set in member 1 as shown, and a lug 29 is formed on hub 4 and near its edge as shown.

At 7 is the driven member having detents 8 mounted on pivots 9 and operating in grooves 10 formed therein, each detent having a lug 11 formed on its inner edge so as to project into chamber 12 in disk 7, the lugs 5 on members 1 also operating in chamber 12 as hereinafter described. Upon disk 7 is positioned a pin 13 as shown, the same being connected to pin 6 in member 1 by spring 14 when in an operative position. Upon the opposite side of disk 7 is positioned a lug 15 as shown. Passing through disk 7 and adjacent to pin 13 is an aperture 16 of unequal diameter to receive a pin 17 also of unequal diameter and so proportioned that pin 17 may project a short distance beyond the surface of disk 7 adjacent pin 13, the pin 17 having a length equal to the thickness of disk 7. Disk 7 also has, in addition to chamber 12, a central opening 18.

At 19 is a buffer plate having a hub 20 to engage opening 18 in disk 7 and having a central opening 21. In plate 19 is formed a groove 22 concentric therewith and adapted to receive lug 15, the said lug operating between a heavy spring 24 and a lighter buffer spring 23 positioned in groove 22. Plate 19 also has an aperture 25 formed therein to receive a pin 26 and a spring 27, aperture 25 being so positioned that it may be alined with aperture 16. At 28 is indicated the magneto shaft.

Figure 7:
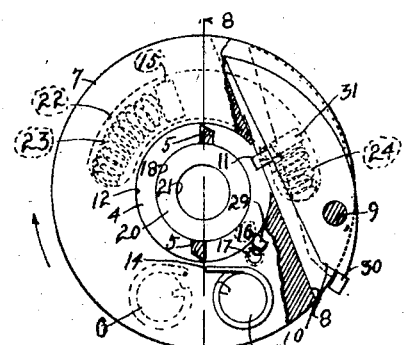
Fig. 7 is a sectional view on 7—7 of Fig. 8, part being broken away.
Figure 9:
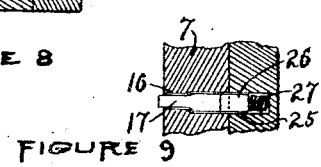
Fig. 9 is a detail section of the pin locking mechanism.

When the device is in position ready for use the several parts are positioned as indicated in Fig. 7, with pins 26 and 27 in the position shown in Fig. 9 so that disk 7 and plate 19 are locked together so that the springs 24 and 23 and lug 15 are inoperative and the timing of the spark is in a normal advanced position. As member 1 is moved in the direction indicated by the arrow the lug 29 on hub 4 presses pins 17 and 26 inwardly against spring 27 until their point of contact is flush with the adjacent surfaces of disk 7 and plate 19 thereby unlocking said members and allowing disk 19 to move backward under the pressure of spring 23. The detents 8 are of the well known weighted type, one of which is normally engaging stop 30. As member 1 continues to revolve against the tension of spring 14 a lug 5 contacts with lug 11 on detent 8 and forces the same out of engagement with stop 30. The instant this occurs disk 7 is thrown suddenly forward by spring 14, lug 15 being in contact with buffer spring 24 member 19 and shaft 28 upon which it is mounted are caused to revolve, the initial spark taking place when lug 15 is in the position 31 with relation to the member 19 and shaft 28 and therefore slightly later than would normally be the case.

The magneto now being in operation, the detents 8 are maintained in an inoperative position by the action of centrifugal force, and spring 23 is compressed by the inertia of the revolving armature until pins 17 and 26 are again in alinement whereupon spring 27 causes them to assume the position shown in Fig. 9 and disk 7 and member 19 are again locked together so that the normal sparking of the magneto is effected.

The repeated sudden wrenching shocks applied to a magneto by the usual type of starter tends to loosen the parts, and magnetos operated through them rapidly deteriorate. In my device the forward plunge of the driven disk 7 is broken by the spring arrangement described. As the magneto slows down to a stop it may be subjected to a number of tripping actions, but in my device no injury results for the reason above set forth. It is also pointed out that a magneto is usually set to spark at a certain definite and most efficient point, and in operating through the medium of my device this point is never altered as the armature is not changed with relation to the breaker in the magneto, but is advanced or retarded with relation to the driving shaft.

It is understood of course that while I have here shown and described a certain specific form of my invention, that changes in form, construction, operation may be made within the scope of the appended claims. I do not wish to be confined to the specific form of tripping and other mechanisms shown. For instance, in the embodiment of my invention shown in Figs. 10 to 18 inclusive I provide a driving member 32 provided with driving connections 33 and having a hub 34, flange 35 and pin 36, and also having cams 37 formed on its outer circumference.

The driven member 38 is of slightly larger diameter than member 32 and is provided with stops 39 as shown and a pin 40 which is connected to pin 36 in member 32 by spring 41. Member 38 also has a central opening 42 adapted to engage hub 34 and a slot 43 as shown in which operates spring 44 and buffer spring 45.

A third plate 46 has a hub 47 to engage the inner surface of hub 34 on member 32, a central opening 48 to engage magneto shaft 49 and a lug 50 adapted to operate in slot 43.

When the device is assembled as shown in Figs. 16 and 17 the parts are held in position by nut 51 on shaft 49, the members 38 and 46 being normally locked in position to produce the usual advanced spark, and member 38 is held by a detent 52 engaging stop 39. Detent 52 is pivoted at 53 and is balanced by a spring member 54 having a fixed end 55. To the pivoted end of detent 52 is secured a reed 56 carrying a boss 57 so positioned as to be in constant contact with the periphery of member 32. Members 37 and 46 are normally locked as stated by means of plate 58 secured to the end of lug 50 and adapted to engage a stop 59 in the surface of member 38, said plate having an outwardly turned edge 60. A finger 61 is provided on the edge of flange 34 of member 32 and adjacent edge 60.

In starting the device the forward movement of member 32 causes finger 61 to engage edge 60 thereby releasing plate 58 from stop 59 and unlocking members 38 and 46, spring 44 throwing lug 50 backward to position 62. The further movement of member 32 causes a cam 37 to force detent 52 out of engagement with stop 39 whereupon spring 41 operates to throw member 38 suddenly forward to produce the hot spark desired. This is done, however, through the medium of plate 46, the plate 46 and the magneto armature being moved backward by spring 44 so that the initial spark is produced at the time members 46 and 38 are in the position indicated by the dotted lug 50 at 62, and the initial hot spark is produced in a predetermined retarded position, the spring 45 taking up the sudden thrust of lug 50.

The boss 57 is in constant contact with the periphery of member 32 and exerts a constant but slight tendency to overcome the balancing effect of spring 54 and the inertia of the disengaged detent and throw said detent into engagement with stop 39. The result is that the said detent is caused to engage stop 39 at each revolution of the revolving members until sufficient speed has been acquired by them to maintain the detent in an inoperative position, but when the members again slow down the detent is caused to engage the stop, and the action is positive in whatever position the device is or may be placed.

The shock absorbing action of springs 44 and 45 is also positive at each tripping action because members 38 and 46 are always automatically unlocked prior to the action of cam 37 and are resiliently connected on both sides of lug 50, but are automatically locked on the rebound after the tripping action, the member 50 being advanced against spring 44 by the inertia of the revolving armature until locked in the advanced position by plate 58 in stop 59.

From the foregoing it is clear that my invention does not reside solely in certain specific arrangements of mechanical elements, but in the form here presented the operation of a natural law is utilized as a direct step in the sequence of operations.

I claim:

1. The combination with an impulse starter and an electric generator operatively mounted with relation to each other, of an elastic medium operatively inserted between said starter and the rotor of said generator.

2. The combination with an impulse starter and an electric generator operatively mounted with relation to each other, of a pair of opposed elastic mediums operatively inserted between said starter and the rotor of said generator.

3. The combination with an impulse starter and an electric generator operatively mounted with relation to each other, of an elastic medium operatively inserted between said starter and the rotor of said generator for positioning the rotor of said generator in a retarded position with relation to said starter whereby retarded sparking action is effected, and means whereby the momentum of said rotor when revolving may be utilized for advancing itself with relation to said starter whereby a normal advanced sparking action is effected.

4. The combination with an impulse starter and an electric generator operatively mounted with relation to each other, of an elastic medium operatively inserted between said starter and the rotor of said generator for positioning the rotor of said generator in a retarded position with relation to said starter whereby retarded sparking action is effected, means whereby the momentum of said rotor when revolving may be utilized for advancing itself with relation to said starter whereby a normal advanced sparking action is effected, and means for holding said rotor in a predetermined advanced position while said generator is in operation.

5. The combination with an impulse starter and an electric generator, of resilient means for positioning the rotor of said generator in a retarded position with relation to said starter whereby a retarded sparking action is effected, a second and oppositely acting elastic medium inserted between said starter and said rotor, and means whereby the momentum of said rotor when revolving may be utilized for advancing itself with relation to said starter whereby a normal advanced sparking action is effected.

6. The combination with an impulse starter and an electric generator operatively mounted with relation to each other, of means for locking said starter and the rotor of said generator in predetermined relation to each other to secure normal advanced sparking of the generator, means for unlocking said starter and said rotor prior to the tripping action of said starter, means for positioning said rotor in a retarded position with relation to said starter whereby a retarded sparking of the generator is effected, means whereby the momentum of the revolving rotor may be utilized to advance itself with relation to said starter whereby a normal advanced sparking of the generator is effected, and means for locking said rotor in said advanced position with relation to said starter.

7. The combination with an impulse starter and an electric generator operatively mounted with relation to each other, of means for positioning the rotor of said generator in a retarded position with relation to said starter whereby retarded sparking action is effected, and means for automatically advancing the rotor of said generator with relation to said starter whereby a normal advanced sparking action is effected.

8. The combination with an impulse starter and an electric generator operatively mounted with relation to each other, of means for positioning the rotor of said generator in a retarded position with relation to said starter whereby retarded sparking action is effected, means for automatically advancing the rotor of said generator with relation to said starter whereby a normal advanced sparking action is effected, and means for maintaining the rotor of said generator in said advanced position.

9. The combination with an impulse starter and an electric generator operatively mounted with relation to each other, of a resilient connection between said starter and the rotor of said generator, means for locking said starter and said rotor in predetermined relation to each other to secure normal sparking of said generator, means for unlocking said starter and said rotor at a predetermined period thereby permitting the retarding of the rotor with relation to said starter, and means whereby the momentum of the revolving rotor is utilized to automatically advance itself upon said starter and automatically lock in a normal sparking position.

10. An impulse starter for electric generators, comprising resiliently connected driving and driven members operatively mounted with relation to each other, means for locking said driven member against rotation, means operated by said driving member for unlocking said driven member at a predetermined period, a resilient connection between said driven member and the rotor of said generator, means for locking said driven member and said rotor in predetermined relation to each other to secure normal advanced sparking action, means for unlocking said driven member and said rotor prior to the unlocking of said driven member by said driving member, means for positioning said rotor when unlocked in a predetermined position with relation to said driven member to secure retarded sparking action, means for automatically positioning said rotor in a predetermined position with relation to said driven member whereby a normal advanced sparking action is secured, and means for automatically locking said rotor in said advanced position.

11. The method of operating an electric generator which consists in compressing an elastic medium between a driving and a driven member, releasing said elastic medium after compression, utilizing the energy of the released elastic medium to revolve the rotor of said generator, and utilizing the momentum of the revolving rotor to advance itself with relation to said driving and said driven members.

In testimony whereof I have hereunto affixed my signature this 27th day of March, 1919.

PONTUS OSTENBERG.